Figure 1:
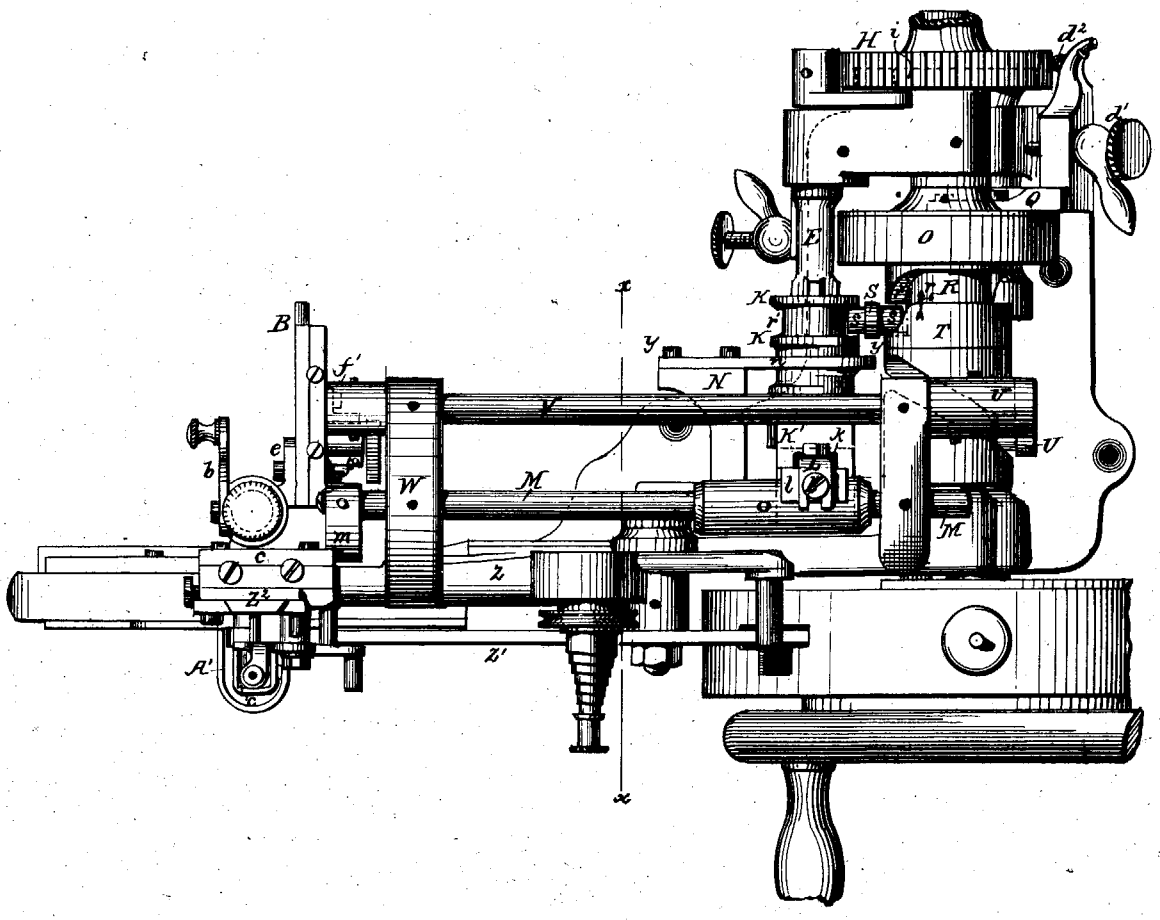

5 Sheets—Sheet 1

F. SIMMONS,

Assignor to the UNITED STATES AUTOMATIC BUTTON HOLE SEWING MACHINE COMPANY.

BUTTON HOLE SEWING MACHINE.

No. 9,962. Reissued Dec. 6, 1881.

Witnesses:
James F. Tobin
David Williams

Inventor:
Friderick Simmons
by his Attorney
H. Howson

F. SIMMONS,

Assignor to the UNITED STATES AUTOMATIC BUTTON HOLE SEWING MACHINE COMPANY.

BUTTON HOLE SEWING MACHINE.

No. 9,962. Reissued Dec. 6, 1881.

Witnesses:
James F. Tobin
David Williams

Inventor:
Frederick Simmons
by his attorney
H. Howson

F. SIMMONS,

Assignor to the UNITED STATES AUTOMATIC BUTTON HOLE SEWING MACHINE COMPANY.

BUTTON HOLE SEWING MACHINE.

No. 9,962. Reissued Dec. 6, 1881.

Witnesses:
James F. Tobin.
David Williams

Inventor:
Frederick Simmons
by his Attorney
H. Howson

F. SIMMONS,

Assignor to the UNITED STATES AUTOMATIC BUTTON HOLE SEWING MACHINE COMPANY.

BUTTON HOLE SEWING MACHINE.

No. 9,962. Reissued Dec. 6, 1881.

Witnesses:
James F. Tobin.
David Williams

Inventor:
Frederick Simmons
by his Attorney
H. Howson

F. SIMMONS,
Assignor to the UNITED STATES AUTOMATIC BUTTON HOLE SEWING MACHINE COMPANY.
BUTTON HOLE SEWING MACHINE.
No. 9,962. Reissued Dec. 6, 1881.
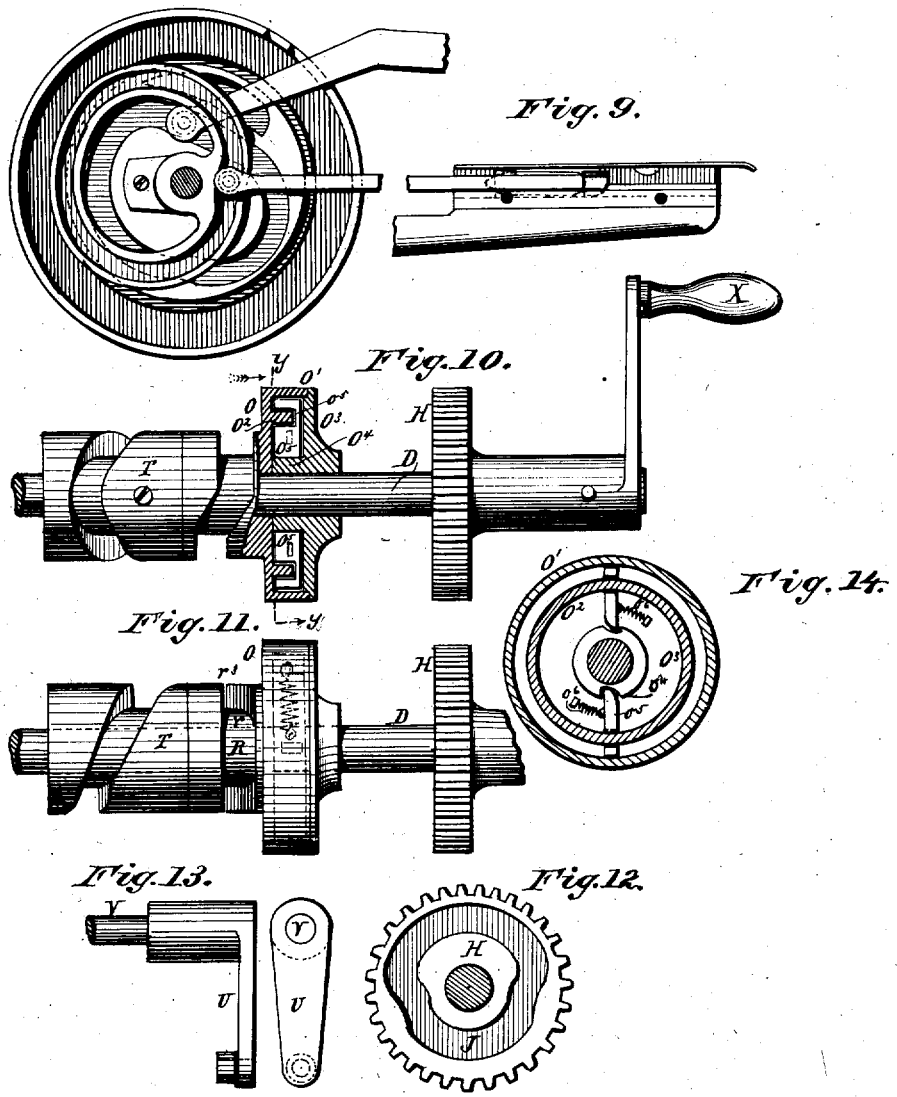
Witnesses
James F. Tobin.
David Williams
Inventor:
Frederick Simmons
by his attorney
H. Howson

UNITED STATES PATENT OFFICE.

FREDERICK SIMMONS, OF WEBBER STREET, BLACKFRIARS ROAD, COUNTY OF SURREY, ENGLAND, ASSIGNOR TO THE UNITED STATES AUTOMATIC BUTTON HOLE SEWING MACHINE COMPANY, OF NEW JERSEY.

BUTTON-HOLE SEWING-MACHINE.

SPECIFICATION forming part of Reissued Letters Patent No. 9,962, dated December 6, 1881.

Original No. 216,902, dated June 24, 1879. Application for reissue filed July 23, 1881.

*To all whom it may concern:*

Be it known that I, FREDERICK SIMMONS, a subject of the Queen of Great Britain and Ireland, and a resident of Webber Street, Blackfriars Road, in the county of Surrey, England, have invented certain Improvements in Button-Hole Sewing-Machines, of which the following is a specification.

This invention has for its object the rapid and effective stitching of button-holes by automatic mechanism.

The main characteristic of that class of machines to which my invention relates lies in the cloth-clamp and the means for imparting thereto certain movements in a horizontal plane with reference to the vertically-reciprocating needle, one of these motions being an intermittent reciprocating movement at right angles to the length of the button-hole, and serving to so place the cloth beneath the needle that the latter will alternately enter it near one edge of the line of the button-hole and pass through the line of the button-hole in order to form the overseam. When the ends of the button-hole are being formed this laterally-reciprocating movement of the cloth-clamps is continued in the same direction, but of about twice the extent of the movement first described, in order to form the bar which strengthens the ends of the button-hole. An intermittent or step-by-step feed motion is imparted to the cloth-clamps at right angles to those described, continuing in one direction about the length of the button-hole, and then taking the reverse direction, the alternately reverse motions being on slightly separated but parallel lines, so that the cloth is fed under the needle so as to form the two edges and ends of the button-hole.

My invention consists more particularly of improvements in the devices for operating and controlling the cloth-clamps, as more fully described hereinafter.

Figure 2:
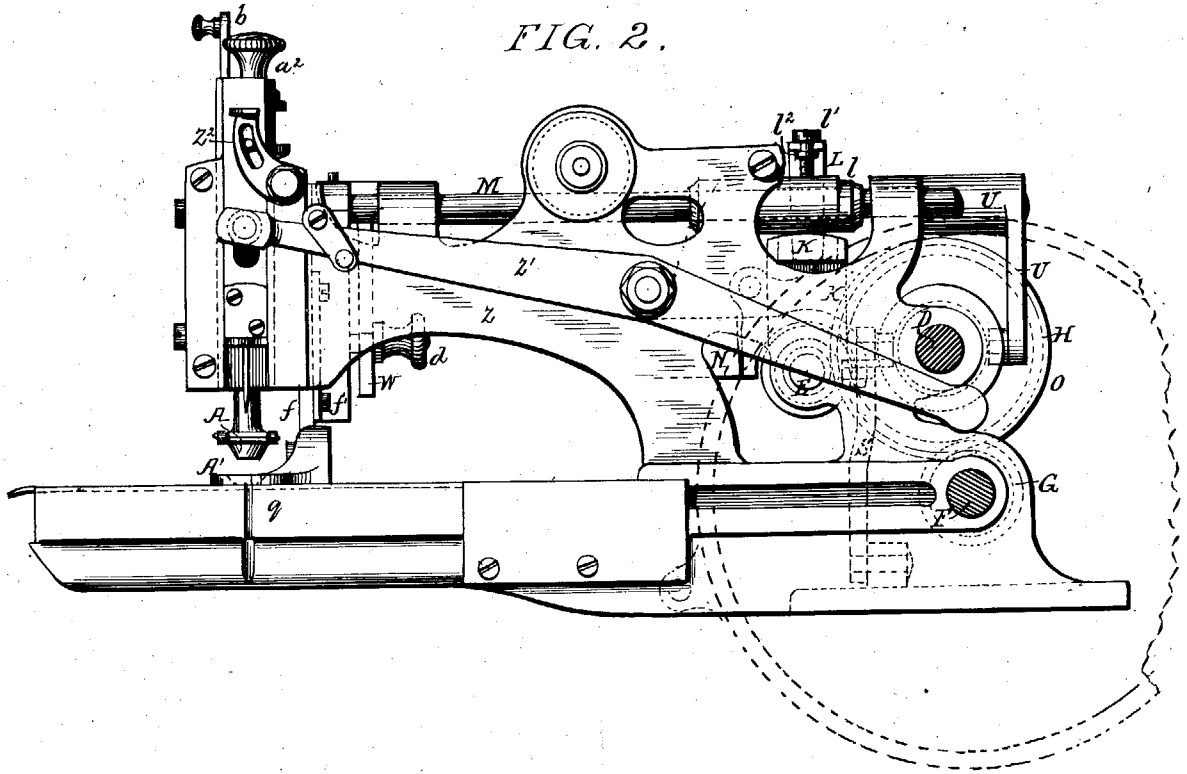
Figure 3:
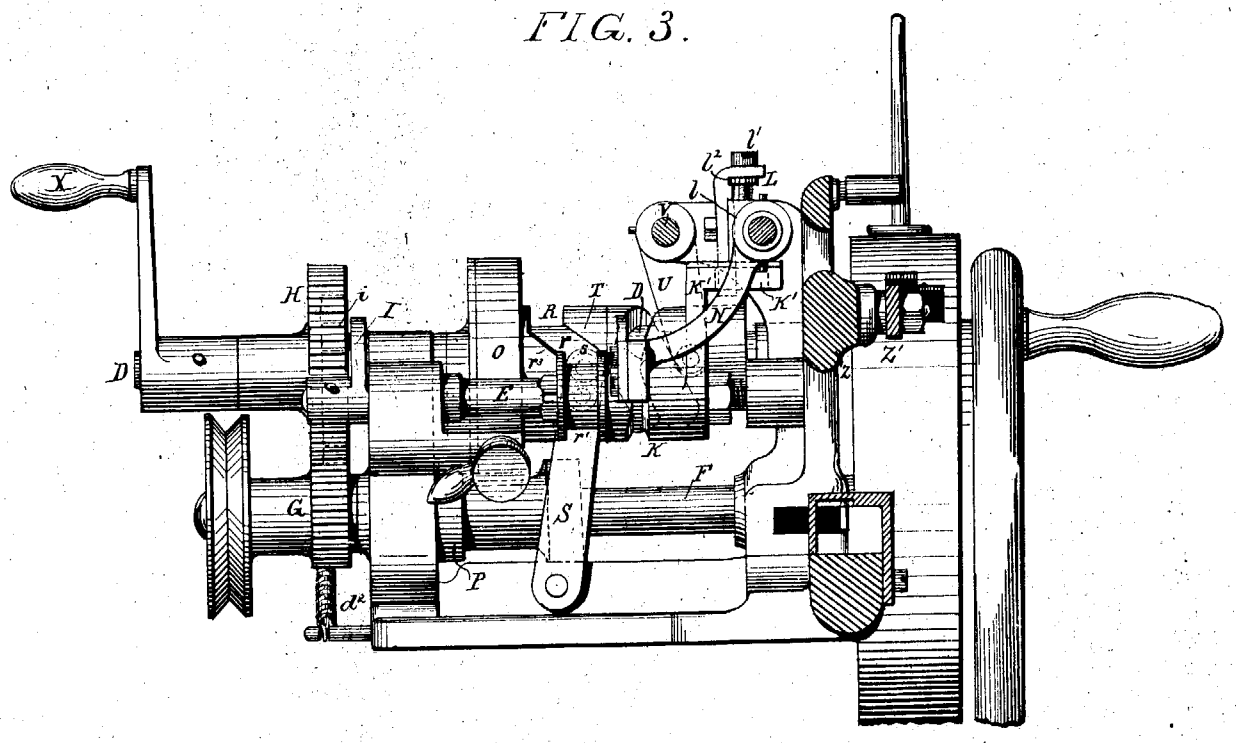
Figure 4:
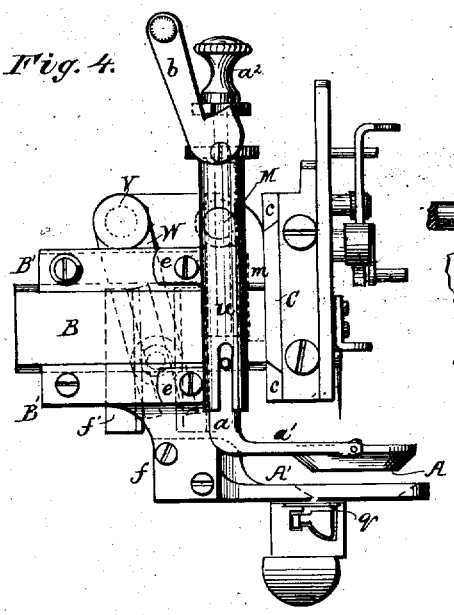
Figure 5:
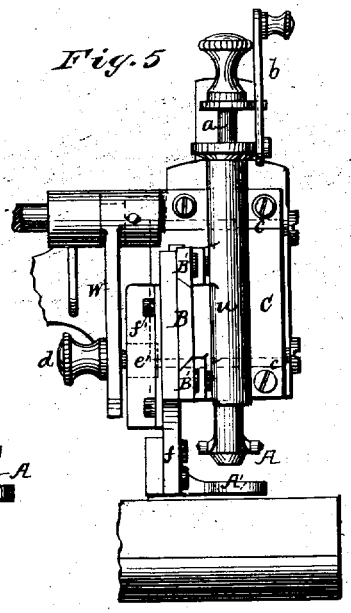
Figure 6:
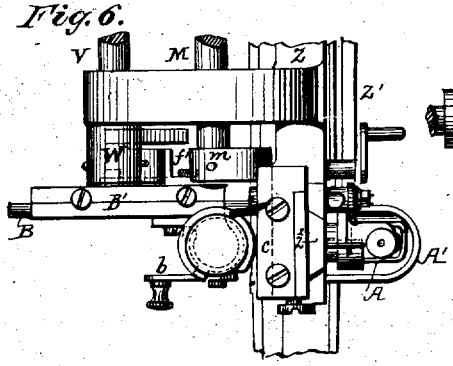
Figure 7:
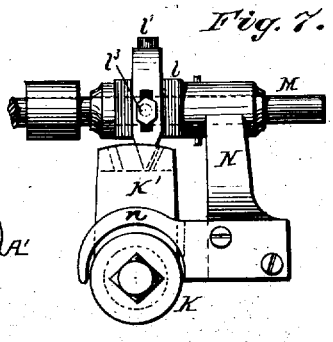
Figure 8:
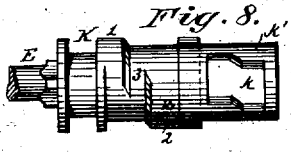

Figure 1 is a plan view of a sewing-machine provided with my improvement. Fig. 2 is a front side elevation of the machine with its hand-wheel and the cams for operating and stitching mechanism removed. Fig. 3 is a section on line *x x* of Fig. 1. Fig. 4 is a front end elevation of the machine. Fig. 5 is a rear side view of the cloth-clamp and its immediate connections. Fig. 6 is a top view of same. Fig. 7 is a view in detail of the connections between the devices for giving the overseam-forming movements. Fig. 8 is a detail view of the sliding cam, which will be hereinafter referred to. Fig. 9 illustrates the needle and shuttle-arm operating cams of the machine to which my improvement is attached. Fig. 10 is a detached view of the cam-shaft of my improvement, showing a diametric section of the feed-wheel. Fig. 11 is a view at right angles to Fig. 10. Fig. 12 is a detached view of the cam-grooved wheel, which imparts a rocking motion to the sliding cam shown in Fig. 8. Fig. 13 shows detached views of the arm which communicates motion to the feed-shaft. Fig. 14 is a section on line *y y*, Fig. 10, showing the internal construction of the feed-wheel.

The letter Z indicates the goose-neck of a sewing-machine, Z′ the needle-operating lever, and $Z^2$ the vertically-reciprocating needle-bar, dovetailed or beveled at its edges and moving in corresponding guides on the front side of the head of the goose-neck. On the rear side of the goose-neck are horizontal dovetail guides *c c*, in which moves a slide, C. Rearwardly from this slide projects a flat arm, B, having its upper and lower edges beveled to fit a dovetailed slide, B′. To an arm, *f*, which projects downward from the inner end of this slide B′, is secured the lower portion, A′, of the cloth-clamp, which extends across the cloth-plate and throat-plate *q* of the machine. This portion A′ is slotted longitudinally for the passage of the needle, the slots being of a size to accommodate the largest button-hole which can be stitched by the machine.

To the slide B′ is secured, by ears *e e*, a vertical sleeve, *u*, standing in front of the arm B, in which sleeve moves a rod, *a*, having at its lower end the laterally-projecting bifurcated portion *a′*, between the arms of which is swiveled the elongated concave clamping-piece A, the bottom of which is open or slotted from end to end. This clamping-piece A is adapted to fit in a corresponding recess (indicated by dotted lines) in the lower portion, A′, of the cloth-clamp. The top of the rod $a$, which projects above the sleeve $u$, is provided with a head, $a''$, having a projecting lug, against which plays the cam-shaped end of a lifting-arm, $b$. A suitable spiral spring is arranged within the sleeve $u$ to depress the rod $a$ after the manner of an ordinary presser-bar. The cloth is to be placed between these two portions of the clamp, the slitted button-hole occupying a central position with respect to the slots in the two parts, and the upper part, A, is firmly pressed upon the cloth by the spring which acts upon the rod $a$ within the sleeve $u$.

The working parts of the machine, which communicate the requisite motions to the cloth-clamp, are attached to three shafts, one of which, F, is the driving-shaft, the second, D, is a cam-shaft, and third, E, is a rocking shaft.

A pinion, G, Fig. 3, and shown in dotted lines in Fig. 2, on the driving-shaft F gears into a toothed wheel, H, Figs. 1, 3, 10, 11, 12, mounted loosely on the cam-shaft D, and in its inner flat face this wheel has a cam-groove, J. A lever, I, fixed to the outer end of the shaft E, is provided with a stud, $i$, (shown in dotted lines,) which projects into the said groove J, and is thus caused to impart to the said rocking shaft E the rocking motion from whence it derives its name. Mounted upon the rocking shaft E in such a way that it must rock with said shaft, but can receive an independent endwise movement, is a sliding cam, K, Figs. 1 and 3. This sliding cam is provided with an upwardly-projecting bent arm, K′, the top or horizontal portion of which is provided with a cleft or slot, $k$, having upwardly-flaring end walls, between which fits loosely the lower pointed end of a vertically-adjustable tongue, L, secured to and moving in a guide, $l$, fixed upon the sliding bar M, and this arm K′ imparts, through the medium of the adjustable tongue L, an endwise-reciprocating motion to said sliding bar M, Figs. 1, 2, 3, 6, and 7, the front end of which is secured to the slide C, which carries the respective parts of the cloth-clamp, said sliding bar M being attached to the slide C through an arm, $m$.

The tongue L is made pointed and vertically adjustable and the end walls of the slot $k$ flaring, for the purpose of regulating the length of the longitudinal reciprocations of the bar M, and consequently the length of the lateral reciprocations of the cloth-clamp. The upper portion of the tongue L is bent at a right angle, and is slotted to embrace a screw, $l'$, between its head and a shoulder, $l''$, the lower portion of said screw being tapped in the top of guide $l$. By means of this screw it will be seen that the tongue L may be raised or lowered and its pointed end caused to extend more or less into the slot $k$, as desired. The vertical portion of the tongue L is provided with a longitudinal slot, through which a pin, $l^3$, projects from guide $l^2$, the screw-threaded tip of said screw being provided with a suitable nut, as shown, by which the tongue L is secured in position. When the wide portion of the point of the tongue L is in the slot $k$ the end walls of said slot will, of course, as the arm K′ vibrates, strike the tongue sooner than when only the narrower portion of the point is in the said slot, and consequently cause the tongue and the bar M to commence moving sooner and to make longer reciprocations, which are communicated to the cloth-clamp, and the lengths of the stitches formed are controlled by adjusting the screw $l'$ up or down. By this sliding bar M are communicated to the slide C and cloth-clamp the lateral reciprocations, which co-operate with the stitching devices to form the overseaming and end bars of the button-hole. The reciprocating sliding bar M is caused to have the variable action necessary to communicate the proper movements to the cloth-clamp for stitching the opposite sides and barring the ends of a button-hole by a saddle-piece, N, projecting downward and outward from said bar, and provided with a curved arm or hook, $n$, Figs. 1 and 7, which bestrides the sliding cam K, and so prevents the bar from being moved too far in either direction.

A wheel, O, Figs. 1, 2, 3, 10, 11, having a peripheral flange, O′, and an inner flange, O″, is fixed upon the cam-shaft D, and forms a part of the feeding mechanism. Upon the same shaft is loosely mounted a disk-wheel, $O^3$, facing the wheel O, and having its periphery rabbeted to receive the edge of flange O′, thus forming, in connection with wheel O, an inclosed box. In the periphery of the hub $O^4$ are formed longitudinal grooves $o^4$, in which rest the tips of clutch-arms $O^5$. These arms extend outward beyond, and have open slots $o^5$, which embrace the inner flange, O″, of the wheel O. Spiral springs $o^6$ connect the clutch-arms $O^5$ with the inner face of the wheel $O^3$.

An arm, Q, projects radially from the outer face of the wheel $O^3$ and over the periphery of a cam, P, Figs. 1 and 3, on the driving-shaft F. A screw, $d'$, passing through said arm, has its tip resting against the lower part of the standard in which shafts D and F have their bearings, and by means of this screw the distance of the arm from the cam may be regulated. A spring, $d^2$, having one end attached to the end of arm Q and the other to the base of the machine, serves to hold the arm Q upon the cam. Now, when the shaft F is rotated the cam P will lift the arm Q, causing wheel $O^3$ to make a partial rotation, and the grooves in the hub of wheel $O^3$ will cause the inner ends of the clutch-arms to move in the same direction and the slotted portions of said arms to clutch the inner flange, O″, and draw forward the wheel O, thus communicating a partial rotation to cam-shaft D. A cam, R, on the cam-shaft D imparts, through the medium of the cross-head $s$ (one end of which is in the groove $r$ and the other in a recess, $r'$, of the sliding cam) of a rocking lever, S, the endwise motion to the sliding cam K on the rocking shaft E, and so regulates the throw of the reciprocating sliding bar M, which is attached to the slide C of the cloth-clamp, which gives the stitch or barring motion. For instance, while the cloth-clamp is traveling in the proper direction to carry the button-hole so that the edge nearest the shafts will be stitched the hook embraces the portion of sliding cam K having the protuberance 1, which prevents the bar M from carrying the presser-foot beyond the proper lateral movement. When the end of the button-hole is reached the cam R will be carried around to such position that a bend, $r^3$, in the groove $r$ of said cam will cause the cross-head $s$ and sliding cam to shift outward in the direction of arrow 5, Fig. 1, so that the hook will embrace the small part 3 of the sliding cam, when the cloth-clamp can make greater lateral reciprocation to form the bar at one end of the button-hole. When this bar is completed the cam R will have so turned that the cross-head $s$ will be out of the bend or curve of the groove $r$ and in a straight circumferential portion of said groove, causing the sliding cam to shift still farther in the direction of arrow 5, causing the hook $n$ to embrace that portion of the sliding cam having the protuberance 2, where it will remain until the opposite edge of the button-hole is stitched. When this edge is stitched another bend in groove $r$, similar to and diametrically opposite the bend $r^3$, will cause the cross-head to shift the sliding cam inward, or in a direction opposite to that indicated by arrow 5, and the hook $n$ will again embrace the small part 3 of the sliding cam until the other end of the button-hole is barred as was the first. Another cam or endless screw, T, the groove in which forms a regular right-and-left-handed screw, is also fixed on the cam-shaft D. A short arm, U, furnished with a pin or stud, takes into the groove in the screw-cam T and gives a rocking motion to a bar, V, at the other end of which is another short arm, W, Figs. 1, 2, 4, 5, and 6, which is slotted and furnished with a thumb-screw, $d$, and nut and runner $e'$. This runner is placed between two guides, $f'$ $f'$, on the slide B′ of the cloth-clamp, the runner being made adjustable by means of the nut, so that a button-hole of any desired length may be indicated.

An arm and handle, X, Figs. 3, 10, 11, is keyed or fixed to the cam-shaft D for the purpose of setting the cloth-clamp in any desired position by turning the shaft D, so that the stitching may be resumed or commenced at any part of the button-hole without withdrawing the cloth from the clamps or operating the stitching mechanism.

Having now set forth the nature of the said invention and explained the manner of carrying the same into effect, I wish it to be understood that I claim—

1. The combination, with the stitching devices, of cloth-clamp composed of parts A A′ and its slides B and C, the sliding bar M, the mechanism for reciprocating said bar longitudinally, the shaft V, mechanism for rocking said shaft, and adjustable devices connecting said shaft to slide B, whereby the extent of the movement of the clamp may be regulated, substantially as described.

2. The combination, with the cloth-clamp and the slides upon which it is caused to move in directions at right angles to each other, of the sliding bar M and means for reciprocating the same longitudinally, saddle-piece N, carrying hook $n$, the sliding cam K, and mechanism for sliding and rocking said cam, substantially as described.

3. The combination, with the longitudinally-reciprocating cloth-clamp, of the sliding bar M, tongue L, saddle-piece N, carrying hook $n$, sliding cam K, having arm K′, slotted to receive said tongue, and the devices, substantially as described, for operating said sliding bar and cam, for the purpose set forth.

4. The combination, with the cloth-clamp and its slides, of the connected sliding bar M, saddle-piece N, carrying hook $n$, the sliding cam K, the oscillating arm carrying cross-head $s$, rotary cam R, rocking shaft V, adjustably connected to the cloth-clamp, the cam and intermediate connections communicating motion to said shaft, the stitching mechanism of a sewing-machine, and mechanism by which motion is communicated to all of said moving parts from a common prime motor, substantially as described.

5. In a button-hole sewing machine, the combination of a cloth-clamp, slides carrying said clamp, a bar connected to the slides, and mechanism, substantially as described, for imparting a reciprocating motion to the said bar and slides, with a hook carried by the bar, and a movable cam controlling the hook, and devices for automatically changing the position of the cam in relation to the hook, all substantially as set forth.

6. In a button-hole sewing-machine, the combination of a cloth-clamp and slides carrying said clamp with a bar having two arms, a cam-screw, T, having a groove in its periphery, forming a regular right-and-left-handed screw and controlling one of said arms, while the other is connected to one of the slides, and with mechanism for imparting an intermittent rotary motion to said cam, substantially as described.

Dated 14th March, 1881.

F. SIMMONS.

Witnesses:
J. J. IRVING,
A. HAMMOND.